(No Model.)

W. SWINDELL.
REGENERATIVE FURNACE.

No. 252,909. Patented Jan. 31, 1882.

Witnesses:
C. E. Lusby
H. L. Ramey

Inventor:
William Swindell
by his atty
F. W. Ritter Jr.

UNITED STATES PATENT OFFICE.

WILLIAM SWINDELL, OF ALLEGHENY, PENNSYLVANIA.

REGENERATIVE FURNACE.

SPECIFICATION forming part of Letters Patent No. 252,909, dated January 31, 1882.

Application filed November 26, 1880. (No model.)

*To all whom it may concern:*

Be it known that I, WILLIAM SWINDELL, of Allegheny, in the county of Allegheny and State of Pennsylvania, have invented a new and useful Improvement in Regenerative Furnaces; and I do hereby declare the following to be a full, clear, and exact description thereof.

My invention relates to certain improvements in the construction of regenerator-furnaces; and it consists in forming the checker-work of a regenerator with wedge-shaped or pointed deflecting upper surfaces to prevent the lodgment of the dust and dirt thereon.

The purpose of this improvement is that in the bricks which form the checker-work, as heretofore made with square upper surfaces, the cinder and other waste products of the hearth, gathering upon the square top of the bricks, form a sort of a drift, which in time extends over the openings between the bricks and closes them, being deposited much in the manner in which snow forms in drifts around and over a hole or opening. My improved construction affords no space for the lodgment of this cinder and other material, and so obviates the collection thereof and clogging of the checker-work, while the lower sides, being broad and flat, as in the ordinary form, spread and distribute the gas and air around through the checker-work in the same manner as heretofore has been done.

To enable others skilled in the art to make and use my invention, I will now describe it with reference to the accompanying drawings, in which—

Figure 1:
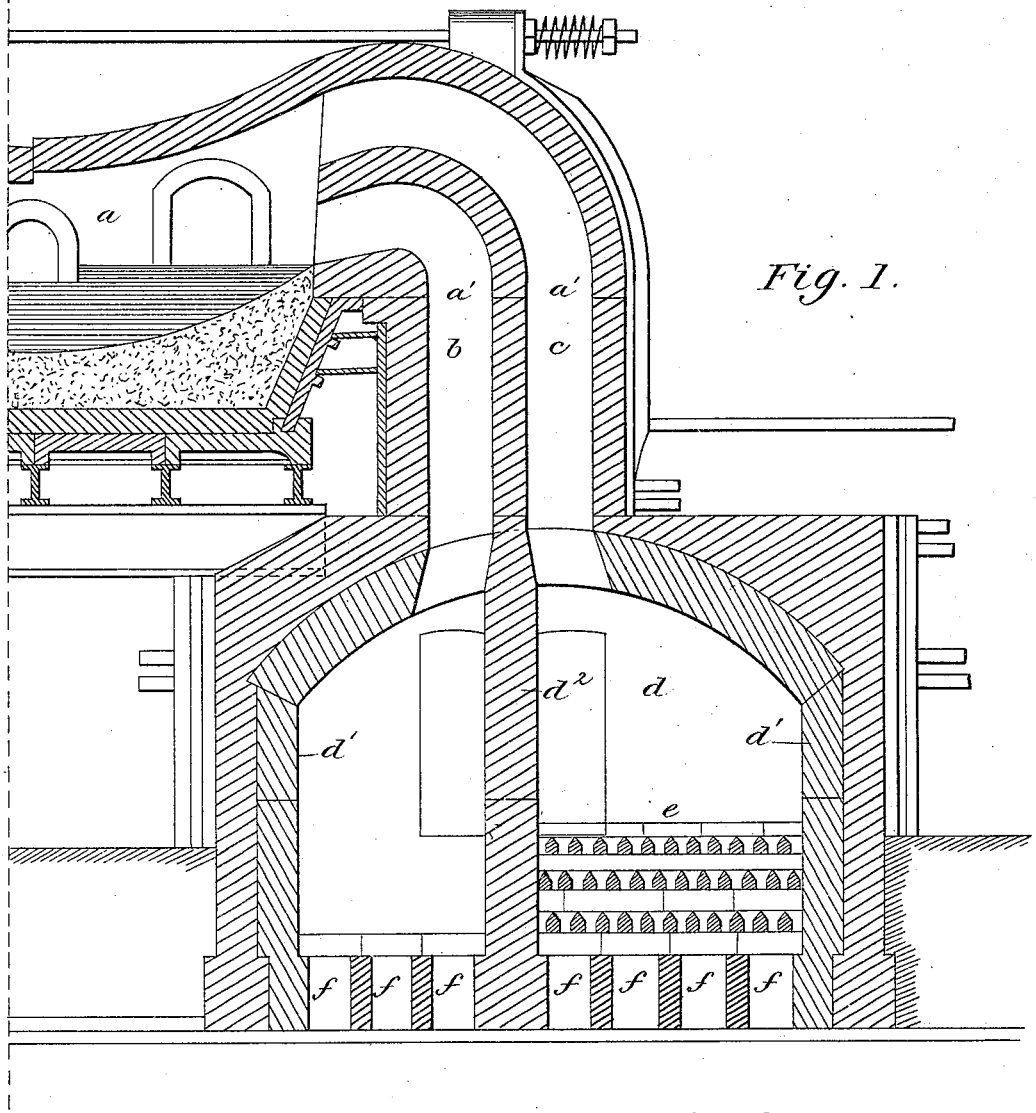
Figure 3:
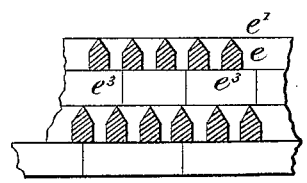
Figure 2:
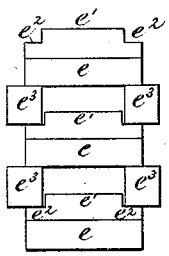

Figure 1 is a vertical section of my improved regenerator-furnace, showing the checker-work in vertical section. Figs. 2 and 3 are enlarged detail views of the checker-work and the preferred form of brick therefor.

The furnace $a$ may be of the usual construction. The air and gas flues $b$ and $c$ are shown as made with a gradual curve, but may be of any desired form, that herein shown being the subject-matter of a separate application.

The checker-work which forms the subject-matter of the present invention is composed of bricks $e$, having a pointed upper edge, $e'$, which is cut away slightly at each end, as at $e^2$, to permit the placing and support of transverse courses of bricks $e^3$, which may be either pointed or square. It is apparent that this sharp upper edge or tapered extension affords no place for the collection of cinders and other substances carried down from the bed of the furnace, and that such substances will fall through the checker-work and be carried down into the lower flues, $f$, where they can be scraped out in the usual manner. The bottoms of the bricks $e$ being broad and flat, cause the inflowing air and gas to be spread out and distributed properly throughout the checker-work.

What I claim as my invention, and desire to secure by Letters Patent, is—

1. A regenerator having its checker-work formed of bricks, having an inclined wedge-shaped or pointed upper surface, substantially as and for the purpose specified.

2. A regenerator-brick having a sharp ridge-comb on its upper edge and notches for receiving the transverse courses, substantially as and for the purpose described.

In testimony whereof I have hereunto set my hand.

WILLIAM SWINDELL.

Witnesses:
T. B. KERR,
JAMES H. PORTE.